US009628246B2

(12) United States Patent
Nabar et al.

(10) Patent No.: US 9,628,246 B2
(45) Date of Patent: *Apr. 18, 2017

(54) AGGREGATING ACKNOWLEDGMENTS TRANSMITTED BY AN ACCESS POINT TO A PLURALITY OF CLIENT STATIONS IN A WIRELESS NETWORK

(71) Applicant: Marvell World Trade LTD., St. Michael (BB)

(72) Inventors: Rohit U. Nabar, Sunnyvale, CA (US); Hongyuan Zhang, Fremont, CA (US); Hui-Ling Lou, Sunnyvale, CA (US)

(73) Assignee: Marvell World Trade LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,586

(22) Filed: Feb. 25, 2016

(65) Prior Publication Data

US 2016/0182206 A1 Jun. 23, 2016

Related U.S. Application Data

(63) Continuation of application No. 14/619,652, filed on Feb. 11, 2015, now Pat. No. 9,294,249, which is a (Continued)

(51) Int. Cl.
*H04W 4/00* (2009.01)
*H04L 5/00* (2006.01)
(Continued)

(52) U.S. Cl.
CPC ......... *H04L 5/0055* (2013.01); *H04B 7/2618* (2013.01); *H04L 5/0005* (2013.01);
(Continued)

(58) Field of Classification Search
CPC .................................................. H04L 5/0055
See application file for complete search history.

(56) References Cited

U.S. PATENT DOCUMENTS 5,539,394 A   7/1996   Cato et al.
6,127,971 A   10/2000  Calderbank et al.
(Continued)

FOREIGN PATENT DOCUMENTS

CN   101960899 A   1/2011
EP   1087630 A1   3/2001
(Continued)

OTHER PUBLICATIONS

English Translation of Office Action for Japanese Application No. 2013-171165 dated Apr. 26, 2016; 5 pages.
(Continued)

*Primary Examiner* — Kevin C Harper

(57) ABSTRACT

An access point including a medium access control module and an acknowledgment generating module. The medium access control module designates a predetermined time period to communicate with a first set of client stations, and instructs a second set of client stations to transmit data at a time other than the predetermined time period. The acknowledgment generating module generates a plurality of acknowledgements in response to receiving data from the first set of client stations during the predetermined time period. The medium access control module aggregates the plurality of acknowledgements in a single aggregated frame. The single aggregated frame includes a plurality of subframes. Each sub-frame of the single aggregated frame includes one of the plurality of acknowledgements. The medium access control module transmit the single aggregated frame to the first set of client stations during the predetermined time period.

10 Claims, 10 Drawing Sheets

Related U.S. Application Data continuation of application No. 13/428,282, filed on Mar. 23, 2012, now Pat. No. 8,958,436, which is a continuation of application No. 12/175,501, filed on Jul. 18, 2008, now Pat. No. 8,149,811.

(60) Provisional application No. 61/057,644, filed on May 30, 2008, provisional application No. 60/950,494, filed on Jul. 18, 2007.

(51) Int. Cl.
  *H04B 7/26* (2006.01)
  *H04W 52/04* (2009.01)
  *H04W 88/08* (2009.01)
  *H04W 72/04* (2009.01)

(52) U.S. Cl.
  CPC ......... *H04W 52/04* (2013.01); *H04W 72/042* (2013.01); *H04W 72/0446* (2013.01); *H04W 88/08* (2013.01)

(56) References Cited

U.S. PATENT DOCUMENTS

| | | |
|---|---|---|
| 6,272,117 B1 | 8/2001 | Choi et al. |
| 6,594,251 B1 | 7/2003 | Raissinia et al. |
| 6,760,388 B2 | 7/2004 | Ketchum et al. |
| 7,209,765 B1 | 4/2007 | Hayase et al. |
| 7,289,481 B2 | 10/2007 | Wax et al. |
| 7,339,949 B2 | 3/2008 | Suzuki et al. |
| 7,372,830 B2 | 5/2008 | Jung et al. |
| 7,394,787 B2 | 7/2008 | Lee |
| 7,411,898 B2 | 8/2008 | Erlich et al. |
| 7,436,903 B2 | 10/2008 | Sandhu et al. |
| 7,493,134 B2 | 2/2009 | Shinozaki |
| 7,532,681 B2 | 5/2009 | Takeda et al. |
| 7,599,332 B2 | 10/2009 | Zelst et al. |
| 7,636,328 B2 | 12/2009 | Teague et al. |
| 7,742,390 B2 | 6/2010 | Mujtaba |
| 7,855,993 B2 | 12/2010 | Mujtaba |
| 7,873,049 B2 | 1/2011 | Gaur et al. |
| 8,009,578 B2 | 8/2011 | Kishigami et al. |
| 8,126,090 B1 | 2/2012 | Nabar |
| 8,144,647 B2 | 3/2012 | Nabar et al. |
| 8,149,811 B2 | 4/2012 | Nabar et al. |
| 8,155,138 B2 | 4/2012 | van Nee |
| 8,194,771 B2 | 6/2012 | Hammerschmidt et al. |
| 8,238,316 B2 | 8/2012 | Stacey |
| 8,289,869 B2 | 10/2012 | Sawai |
| 8,320,301 B2 | 11/2012 | Walton et al. |
| 8,331,419 B2 | 12/2012 | Zhang et al. |
| 8,339,978 B2 | 12/2012 | Sawai et al. |
| 8,411,807 B1 | 4/2013 | Rangarajan et al. |
| 8,437,440 B1 | 5/2013 | Zhang et al. |
| 8,462,643 B2 | 6/2013 | Walton et al. |
| 8,462,863 B1 | 6/2013 | Zhang et al. |
| 8,498,362 B2 | 7/2013 | Zhang et al. |
| 8,526,351 B2 | 9/2013 | Fischer et al. |
| 8,527,853 B2 | 9/2013 | Lakkis |
| 8,542,589 B2 | 9/2013 | Surineni et al. |
| 8,559,803 B2 | 10/2013 | Huang et al. |
| 8,588,144 B2 | 11/2013 | Nabar et al. |
| 8,599,803 B1 | 12/2013 | Zhang et al. |
| 8,599,804 B2 | 12/2013 | Erceg et al. |
| 8,619,907 B2 | 12/2013 | Mujtaba et al. |
| 8,718,191 B2 | 5/2014 | Lee et al. |
| 8,724,720 B2 | 5/2014 | Srinivasa et al. |
| 8,837,524 B2 | 9/2014 | Liu |
| 8,867,653 B2 | 10/2014 | Zhang et al. |
| 8,948,283 B2 | 2/2015 | Zhang |
| 8,958,436 B2 | 2/2015 | Nabar et al. |
| 8,982,889 B2 | 3/2015 | Zhang |
| 9,021,341 B1 | 4/2015 | Srinivasa et al. |
| 9,077,594 B2 | 7/2015 | Banerjea et al. |
| 9,088,466 B2 | 7/2015 | Banerjea |
| 9,124,402 B2 | 9/2015 | Nabar et al. |
| 9,294,249 B2* | 3/2016 | Nabar ................ H04B 7/2618 |
| 2001/0038619 A1 | 11/2001 | Baker et al. |
| 2002/0150058 A1 | 10/2002 | Kim et al. |
| 2002/0174172 A1 | 11/2002 | Hatalkar |
| 2003/0128658 A1 | 7/2003 | Walton et al. |
| 2004/0136465 A1 | 7/2004 | Hwang et al. |
| 2004/0146018 A1 | 7/2004 | Walton et al. |
| 2004/0203472 A1 | 10/2004 | Chien |
| 2004/0208253 A1 | 10/2004 | Joo |
| 2005/0013239 A1 | 1/2005 | Agrawal et al. |
| 2005/0015703 A1 | 1/2005 | Terry et al. |
| 2005/0068900 A1 | 3/2005 | Stephens et al. |
| 2005/0111451 A1 | 5/2005 | Kim |
| 2005/0136933 A1 | 6/2005 | Sandhu et al. |
| 2005/0195786 A1 | 9/2005 | Shpak |
| 2005/0195858 A1 | 9/2005 | Nishibayashi et al. |
| 2005/0233709 A1 | 10/2005 | Gardner et al. |
| 2005/0254457 A1 | 11/2005 | Jung et al. |
| 2005/0281243 A1 | 12/2005 | Horn et al. |
| 2006/0007898 A1 | 1/2006 | Maltsev et al. |
| 2006/0009189 A1 | 1/2006 | Kim et al. |
| 2006/0045048 A1 | 3/2006 | Kwon et al. |
| 2006/0114865 A1 | 6/2006 | Hashimoto et al. |
| 2006/0114878 A1 | 6/2006 | Choe et al. |
| 2006/0120341 A1 | 6/2006 | Del Prado Pavon et al. |
| 2006/0176968 A1 | 8/2006 | Keaney et al. |
| 2006/0233271 A1 | 10/2006 | Savas et al. |
| 2006/0250938 A1 | 11/2006 | Khan et al. |
| 2006/0268671 A1 | 11/2006 | Coon |
| 2006/0280134 A1 | 12/2006 | Kwon et al. |
| 2006/0280155 A1 | 12/2006 | Kwon et al. |
| 2007/0047666 A1 | 3/2007 | Trachewsky |
| 2007/0049208 A1 | 3/2007 | Kim et al. |
| 2007/0060155 A1 | 3/2007 | Kahana et al. |
| 2007/0070927 A1 | 3/2007 | Shoki et al. |
| 2007/0081602 A1 | 4/2007 | Tanaka et al. |
| 2007/0086400 A1 | 4/2007 | Shida et al. |
| 2007/0121705 A1 | 5/2007 | French et al. |
| 2007/0153725 A1 | 7/2007 | Waxman |
| 2007/0211823 A1 | 9/2007 | Mazzarese et al. |
| 2007/0230338 A1 | 10/2007 | Shao et al. |
| 2007/0286122 A1 | 12/2007 | Fonseca |
| 2008/0049654 A1 | 2/2008 | Otal et al. |
| 2008/0118011 A1 | 5/2008 | Trachewsky et al. |
| 2008/0205317 A1 | 8/2008 | Piipponen et al. |
| 2008/0227475 A1 | 9/2008 | Suemitsu et al. |
| 2008/0253328 A1 | 10/2008 | Sahinoglu et al. |
| 2008/0298435 A1 | 12/2008 | Lakkis |
| 2008/0299962 A1 | 12/2008 | Kasher |
| 2009/0022093 A1 | 1/2009 | Nabar et al. |
| 2009/0022128 A1 | 1/2009 | Nabar et al. |
| 2009/0060094 A1 | 3/2009 | Jung et al. |
| 2009/0190547 A1 | 7/2009 | Shi et al. |
| 2009/0196163 A1 | 8/2009 | Du |
| 2009/0257476 A1 | 10/2009 | Watanabe |
| 2009/0285319 A1 | 11/2009 | Zhang et al. |
| 2010/0046358 A1 | 2/2010 | van Nee |
| 2010/0046656 A1 | 2/2010 | van Nee et al. |
| 2010/0074362 A1 | 3/2010 | Lim et al. |
| 2010/0098146 A1 | 4/2010 | Kim et al. |
| 2010/0120692 A1 | 5/2010 | Ford |
| 2010/0158164 A1 | 6/2010 | Oh et al. |
| 2010/0166087 A1 | 7/2010 | Lomnitz |
| 2010/0246543 A1 | 9/2010 | Rajkotia et al. |
| 2010/0260159 A1 | 10/2010 | Zhang et al. |
| 2010/0309958 A1 | 12/2010 | Lakkis |
| 2011/0002219 A1 | 1/2011 | Kim et al. |
| 2011/0002280 A1 | 1/2011 | Davydov et al. |
| 2011/0002319 A1 | 1/2011 | Husen et al. |
| 2011/0002430 A1 | 1/2011 | Kim et al. |
| 2011/0013616 A1 | 1/2011 | Fischer et al. |
| 2011/0051705 A1 | 3/2011 | Jones, IV et al. |
| 2011/0096796 A1 | 4/2011 | Zhang et al. |
| 2011/0134899 A1 | 6/2011 | Jones, IV et al. |
| 2011/0142020 A1 | 6/2011 | Kang et al. |
| 2011/0299382 A1 | 12/2011 | Van Nee et al. |
| 2011/0305178 A1 | 12/2011 | Zheng et al. |
| 2011/0305296 A1 | 12/2011 | Van Nee |

(56) References Cited

U.S. PATENT DOCUMENTS

| | | |
|---|---|---|
| 2012/0039406 A1 | 2/2012 | Srinivasa et al. |
| 2012/0195391 A1 | 8/2012 | Zhang et al. |
| 2012/0201316 A1 | 8/2012 | Zhang et al. |
| 2012/0224570 A1 | 9/2012 | Seok et al. |
| 2012/0294294 A1 | 11/2012 | Zhang |
| 2012/0300874 A1 | 11/2012 | Zhang |
| 2012/0302272 A1 | 11/2012 | Hakola et al. |
| 2012/0314583 A1 | 12/2012 | Hart et al. |
| 2012/0320889 A1 | 12/2012 | Zhang et al. |
| 2013/0016642 A1 | 1/2013 | Banerjea et al. |
| 2013/0016737 A1 | 1/2013 | Banerjea |
| 2013/0051260 A1 | 2/2013 | Liu |
| 2013/0177096 A1 | 7/2013 | Park et al. |
| 2013/0199851 A1 | 8/2013 | Koch et al. |
| 2013/0202001 A1 | 8/2013 | Zhang |
| 2013/0235908 A1 | 9/2013 | Zhang et al. |
| 2013/0243115 A1 | 9/2013 | Taghavi Nasrabadi et al. |
| 2013/0287043 A1 | 10/2013 | Nanda et al. |
| 2014/0071973 A1 | 3/2014 | Nabar et al. |
| 2015/0003276 A1 | 1/2015 | Liu |
| 2015/0136933 A1 | 5/2015 | Merzon |
| 2015/0155998 A1 | 6/2015 | Nabar et al. |
| 2015/0189639 A1 | 7/2015 | Zhang |

FOREIGN PATENT DOCUMENTS

| | | |
|---|---|---|
| EP | 1286491 A1 | 2/2003 |
| EP | 1357693 A1 | 10/2003 |
| EP | 1545025 A1 | 6/2005 |
| EP | 1598975 A2 | 11/2005 |
| EP | 1679803 A2 | 7/2006 |
| JP | 64-021059 | 1/1989 |
| JP | 62176235 | 1/1989 |
| JP | 06268575 | 9/1994 |
| JP | H11-275056 A | 10/1999 |
| JP | 2003179581 A | 6/2003 |
| JP | 2005102136 A | 4/2005 |
| JP | 2005509360 A | 4/2005 |
| JP | 2005512447 A | 4/2005 |
| JP | 2005514859 A | 5/2005 |
| JP | 2005236686 A | 9/2005 |
| JP | 2005528002 A | 9/2005 |
| JP | 2006504335 A | 2/2006 |
| JP | 2006197586 A | 7/2006 |
| JP | 2006520109 A | 8/2006 |
| JP | 2006254235 A | 9/2006 |
| JP | 2006295736 A | 10/2006 |
| JP | 2006319959 A | 11/2006 |
| JP | 2006333236 A | 12/2006 |
| JP | 2007096744 A | 4/2007 |
| JP | 2007110317 A | 4/2007 |
| JP | 2007110456 A | 4/2007 |
| JP | 2007124376 A | 5/2007 |
| JP | 2007520161 A | 7/2007 |
| JP | 2010200122 A | 9/2010 |
| WO | WO-03005652 A1 | 1/2003 |
| WO | WO-03041300 A1 | 5/2003 |
| WO | WO-03058881 A2 | 7/2003 |
| WO | WO-2004084436 A1 | 9/2004 |
| WO | WO-2005067212 A1 | 7/2005 |
| WO | WO-2005079012 A1 | 8/2005 |
| WO | WO-2006000988 A1 | 1/2006 |
| WO | WO-2006020520 A2 | 2/2006 |
| WO | WO-2006048037 A1 | 5/2006 |
| WO | WO-2006051771 A1 | 5/2006 |
| WO | WO-2006054252 A1 | 5/2006 |
| WO | WO-2006132506 A1 | 12/2006 |
| WO | WO-2007043108 A1 | 4/2007 |
| WO | WO-2007052150 A1 | 5/2007 |
| WO | WO-2007073040 A1 | 6/2007 |
| WO | WO-2009012448 A2 | 1/2009 |
| WO | WO-2009059229 A1 | 5/2009 |
| WO | WO-2009114612 A1 | 9/2009 |
| WO | WO-2010005775 A1 | 1/2010 |
| WO | WO-2010095793 A1 | 8/2010 |
| WO | WO-2010095802 A1 | 8/2010 |
| WO | WO-2010120692 A1 | 10/2010 |
| WO | WO-2011006108 A2 | 1/2011 |
| WO | WO-2011031058 A2 | 3/2011 |
| WO | WO-2011031454 A1 | 3/2011 |
| WO | WO-2011049314 A2 | 4/2011 |
| WO | WO-2011120692 A2 | 10/2011 |
| WO | WO-2012122119 A1 | 9/2012 |

OTHER PUBLICATIONS

Aikawa, 802.11 High-Speed Wireless LAN Textbook, Impress R&D, Apr. 11, 2008, pp. 260-265 and 276-279; No translation provided.

Japanese Office Action for JP2014-520406 dated Mar. 15, 2016.

Japanese Office Action for JP2014-528392 dated Mar. 23, 2016.

U.S. Appl. No. 12/730,651, filed Mar. 24, 2010, Zhang et al.

U.S. Appl. No. 13/159,143, filed Jun. 13, 2011, Srinivasa et al.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancement for Higher Throughput," The Institute of Electrical and Electronics Engineers, Inc., Sep. 2007; 544 pages.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancement for Higher Throughput," The Institute of Electrical and Electronics Engineers, Inc., Oct. 29, 2009; 535 pages.

The International Search Report and Written Opinion of the International Searching Authority for corresponding International Application No. PCT/US2011/043134, mailed Nov. 2, 2011, 10 Pages.

Alcatel-Lucent et al, Dedicated Reference Signals for MU-MIMO Precoding in E-UTRA Downlink, 3GPP R1-071069, Feb. 16, 2007; 3 Pages.

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 Pages.

Chang, Yuang; Wang, Junyi; Zhu, Houtao; Kashima, Tsuyoshi; Araki, Kiyomichi; Integrated User Scheduling Algorithm for Multi-User MIMO-Downlink System; IEICE Technical report; Jun. 21, 2007, vol. 107, No. 113, pp. 91-96; RCS2007-26.

Chen, "Home Network Basis: Transmission Environments and Wired/Wireless Protocols," Prentice Hall, pp. 1-26 (Jul. 2003).

de Vegt, Rolf; Potential Compromise for 802.11ah Use Case Document; IEEE 802.11-11/0457r0; Mar. 2011; 27 pages.

English Translation of Office Action for Japanese Application No. 2013-171165 dated Jul. 7, 2015; 3 pages.

Examiner's Report to the Board dated Feb. 4, 2016 for related Japanese Application No. 2013-171165; 2 pages.

First Office Action from Chinese Patent Office for Chinese Patent Application No. 200800250809; Translated; 7 Pages.

First Office Action in Chinese Application No. 201280014281.5, dated Jul. 3, 2015, no English translation provided (12 pages).

Freescale Semiconductor Inc., Downlink reference signaling for MU-MIMO, 3GPP R1-071509, Mar. 17, 2007; 4 Pages.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

Haene et al., "A Real-Tim 4-Stream MIMO-OFDM Transceiver: System Design, FPGA Implementation, and Characterization," IEEE Journal on Selected Areas in Communications, vol. 26, No. 6 ( Aug. 2008); 13 Pages.

Harada, "Project: IEEE P802.15 Working Group for Wireless Personal Area Network (WPANs)," IEEE 802.15-07-0693-003c (May 2007).

(56) References Cited

OTHER PUBLICATIONS

Hiertz, et al., "The IEEE 802.11 Universe," IEEE Communications Magazine, pp. 62-70, Jan. 2010.
Huaning Niu et al., "Advanced Wireless Communication Systems and Techniques", Jul. 6, 2009, U.S. Appl. No. 61/223,360, 93 Pages.
IEEE 802.11-11/042lrl, D1.0 PHY Comments Discussion, Mar. 15, 2011, 14 pages.
IEEE 802.11-11/1483rl, 11ah Preamble for 2MHz and Beyond, Nov. 7, 2011, 17 pages.
IEEE 802.11ah; IEEE 802.11-11/0035r0; Heejung Yu, Il-gy Lee, Minho Cheng, Hun Sik Kang, Sok-kuy Lee; Dated Jan. 12, 2011; 10 Pages.
IEEE 802.16; IEEE Standard for Local and Metropolitan Area Networks; Part 16: Air Interface for Broadband Wireless Access Systems: IEEE Computer Society and the IEEE Microwave Theory and Techniques Society; 2009; 2082 Pages.
IEEE 802.20-PD-06; IEEE P 802.20™ V14; Jul. 16, 2004; Draft 802.20 Permanent Document; System Requirements for IEEE 802.20 Mobile Broadband Wireless Access. Systems-Version 14; 24 pages.
IEEE P802.11, Wireless LANs, Mar. 2012, 2793 pages.
IEEE P802.11-09/0992r11—Specification Framework for Tgac, [Online] May 18, 2010, retrieved from the Internet: https://mentor.ieee.org/802.11/dcn/09/11-09-0992-11-00ac-proposed-specifiction-framework-for-tgac.doc, pp. 1-10.
IEEE P802.11ac/D0.2 Draft Standard for Information Technology Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz, Jan. 2012, 359 pages.
IEEE P802.11ac/D0.2 Draft Standard for Information Technology Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz, Mar. 2011, 184 pages.
IEEE P802.11nTM, IEEE Standard for Information Technology—Telecommunication and information exchange between systems—Local and metropolitan area networks—Specific requirements; Part 11: Wireless LAN Medium Access Control (MAC) and Physcial Layer (PHY) Specifications; Amendment 5 Enhancements for Higher Throughput; "*The Institute of Electrical and Electronics Engineers, Inc.*" Oct. 2009.
IEEE P802.11nTM/D3.00, Draft Standard for Information Technology—Telecommunication and information exchange between systems—Local and metropolitan area networks—Specific requirements; Part 11: Wireless LAN Medium Access Control (MAC) and Physcial Layer (PHY) Specifications; Amendment 4 Enhancements for Higher Throughput; "*The Institute of Electrical and Electronics Engineers, Inc.*" Sep. 2007.
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007); 1232 pages.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999); Sep. 16, 1999; 91 Pages.
IEEE Std 802.11ac/D2.0 Draft Standard for Information Technology—Telecommunications and information exchange between systems—Local and metropolitan area networks—Specific requirements—Part 11: Wireless LAN Medium Access Control (MAC) and Phsycial Layer (PHY) specification: Amendment 4: Enhancements for Very High Throughput for Operation in Bands below 6 GHz, The Institution of Electrical and Electronics Engineers, Inc., Jan. 2012; 359 Pages.
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4 Enhancements for Very High Throughput for Operation in Bands below 6 GHz," The Institute of Electrical and Electronics Engineers, Inc., pp. 1-363 (Mar. 2012).
IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4 Enhancements for Very High Throughput for Operation in Bands below 6 GHz," The Institute of Electrical and Electronics Engineers, Inc., pp. 1-385 (Jun. 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4 Enhancements for Very High Throughput for Operation in Bands below 6 GHz," The Institute of Electrical and Electronics Engineers, Inc., pp. 1-408 (Oct. 2012).
IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operations," The Institute of Electrical and Electronics Engineers, Inc., Nov. 2011; 123 Pages.
IEEE Std 802.11b-1999 (Supplement to IEEE Std 802.11-1999 Edition); Supplement to IEEE Standard for Information technology—Telecommunications and information exchange between systems—Local and Metropolitan area networks—Specific requirements—Part 11: Wireless LAN Medium Access control (MAC) and Physical Layer (PHY) specifications: Higher-Speed Physical Layer Extension in the 2.4 GHz Band: LAN/MAN Standards Committee of the IEEE Computer Society; Sep. 16, 1999 IEEE-SA Standards Board; 96 pages.
IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," The Institute of Electrical and Electronics Engineers, Inc. Nov. 7, 2001; 23 pages.
IEEE Std 802.11g/D2.8, May 2002 (Supplement to ANSI/IEEE Std 802.11, 1999 Edition) "Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," The Institution of Electrical and Electronics Engineers, Inc., May 2002; 53 Pages.

(56) References Cited

OTHER PUBLICATIONS

IEEE Std 802.11h™-2003 [Amendment to IEEE Std 802.11™, 1999 Edition (Reaff 2003) as amended by IEEE Stds 802.11a™-1999, 802,11b™-1999, 802.11b™-1999/Cor Jan. 2001, 802,11d™-2001, 802.11g™-2003]; IEEE Standard for Information Technology—Telecommunications and information exchange between systems—Local and metropolitan area networks—Specific requirements: Part 11: Wireless LAN Medium Access Control (MAC) and Physical Layer (PHY) specifications; Amendment 5: Spectrum and Transmit Power Mangement Extensions in the 5 GHz band in Europe; IEEE Computer Society; LAN/MAN Standards Committee; Oct. 14, 2003; 75 Pages.

IEEE Std 802.11™-2012, IEEE Standard for Information technology—Telecommunications and information exchange between systems Local and metropolitan area networks—Specific requirements, Part 11: Wireless LAN Medium Access Control (MAC) and Physical Layer (PHY) Specifications, Mar. 29, 2012, 2793 pages.

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

IEEE Std 802.16TM-2001; IEEE Standard for Local and metropolitan area networks, Part 16: Air Interface for Fixed Broadband Wireless Access Systems; LAN/MAN Standards Committee, IEEE Computer Society and IEEE Microwave Theory and Techniques Society; Apr. 8, 2002; 349 Pages.

IEEE Std P802.11-REVma/06.0, "Unapproved Draft Standard for Information Technology—Telecommunications and information exchange between systems—Local and metropolitan area networks—Specific requirements—Part 11: Wireless LAN Medium Access Control (MAC) and Phsycial Layer (PHY) specification. (This document reflects the combining of the 2003 of the 2003 Edition of 802.11 plus the 802.11g, 802.11h 802.11i and 802.11j Amendments) (Revision of IEEE Std 802.11-1999)(Superseded by P802.11-REVma_D7.0)," 2006; 1212 Pages.

IEEE Std P802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003; 69 Pages.

IEEE Std. P802.11ad/D5.0 "Draft Standard for Information Technology—Telecommunications and information exchange between systems—Locl and metropolitan area networks—Specific requirements, Part 11: Wireless LAN Medium Access Control (MAC) and Physical Layer (PHY) specifications: Amendment 3: Enhancements for Very High Throughput in the 60 GHz Band," The Institute of Electrical and Electronics Engineers, Inc., Sep. 2011.

Imashioya et al., "RTL Design of 1.2 Gbps MIMO WLAN System and its Business Aspect," IEEE 9th Int'l Symposium on Communications and Information Technology (ISCIT 2009), The Institute of Electrical and Electronics Engineers 2009; pp. 296-301.

International Preliminary Report on Patentability in corresponding PCT/US2012/022768 dated Jul. 30, 2013.

International Search Report and Written Opinion for International Application No. PCT/US2012/022768, dated Jul. 5, 2012; 17 Pages.

International Search Report and Written Opinion of the International Searching Authority, dated Jul. 19, 2012; in reference to PCT/US/2012/036917, filed Aug. 5, 2012; 15 pages.

Invitation to Pay Additional Fees and Partial International Search Report for International Application No. PCT/US2012/022769, dated Apr. 26, 2012; 8 Pages.

Invitation to Pay Additional Fees and, where Applicable, Protest Fee dated Jan. 21, 2009 in reference to PCT/US2008/070469; 25 Pages.

Japanese Office Action dated Apr. 17, 2013; 6 Pages.

Japanese Office Action dated Nov. 28, 2013 for Japanese Application No. 2012-165994; 2 Pages.

Japanese Office Action for related Japanese Application No. 2013-171165 dated Feb. 17, 2015; 2 pages.

Japanese Rejection for Japanese Patent Application No. 2014-511395 dated Dec. 16, 2014; 4 pages.

Lee et al., "TGaf PHY proposal," The Institute of Electrical and Electronics Engineers, doc. No. IEEE 802.11-12/0809r5, pp. 1-43 (Jul. 10, 2012).

Notice of Allowance in U.S. Appl. No. 13/689,244, dated May 15, 2015 (12 pages).

Notice of Reason for Rejection from Japanese Patent Office for Japanese Patent Application No. 2010-517185; Translation from RYUKA IP Law Firm; 3 Pages.

Notification of Transmittal of the International Search Report and the Written Opinion of the International Searching Authority dated Oct. 17, 2012; International Application No. PCT/US2012/046929, International Filing Date Jul. 16, 2012; 4 Pages.

Notification of Transmittal of the International Search Report and the Written Opinion of the International Searching Authority dated Oct. 17, 2012; International Application No. PCT/US2012/046929, International Filing Date Jul. 16, 2012; 7 pages.

Notification of Transmittal of the International Search Report and the Written Opinion of the International Searching Authority for PCT/US2012/046908, International Filing Date Jul. 16, 2012, 13 pages.

Notification of Transmittal of the International Search Report and the Written Opinion of the International Searching Authority, or the Declaration dated Dec. 23, 2008 in reference to PCT/US2008/070466; 14 pages.

Office Action for U.S. Appl. No. 13/689,244, dated Feb. 23, 2015.
Office Action for U.S. Appl. No. 13/689,244, dated Jul. 17, 2014.
Office Action for U.S. Appl. No. 13/477,920 mailed Jan. 28, 2014.
Office Action in Japanese Application No. 2013-551344, dated Sep. 15, 2015, with English translation (5 Pages).
Office Action in U.S. Appl. No. 13/689,183, dated Aug. 1, 2014.
Office Action in U.S. Appl. No. 13/689,183, dated Feb. 4, 2015.
Office Action in U.S. Appl. No. 13/689,183, dated Jun. 29, 2015.
Office Action in U.S. Appl. No. 13/689,223 dated Aug. 12, 2015 (13 Pages).
Office Action in U.S. Appl. No. 13/689,223, dated Apr. 9, 2014.
Office Action in U.S. Appl. No. 13/689,223, dated Mar. 17, 2015.
Office Action in U.S. Appl. No. 13/689,223, dated Sep. 11, 2014.
Park, "Proposed Specification Framework for Tgah D9.x", The Institute of Electrical and Electronics Engineers, doc. No. IEEE 802.11-1yy/xxxxr0, Jul. 2012.

Park, "Proposed Specification Framework for Tgah", The Institute of Electrical and Electronics Engineers, doc. No. IEEE 802.11-11/1137r11, Sep. 2012.

Park, "Proposed Specification Framework for Tgah", The Institute of Electrical and Electronics Engineers, doc. No. IEEE 802.11-11/1137r6, Mar. 2012.

Park, "Proposed Specification Framework for Tgah", The Institute of Electrical and Electronics Engineers, doc. No. IEEE 802.11-1yy/xxxxr05, Jan. 2012.

Perahai, et al., "Gigabit Wireless LANs: an overview of IEEE 802.11ac and 802.11ad," ACM SIGMOBILE Mobile Computing and Communications Review, vo. 15, No. 3, Jul. 2011; pp. 23-33.

Ritt et al.; "Eigen-mode Close-Loop Transmission for E-UTRA MIMO"; 3GPP R1-060421; Feb. 17, 2006; 9 pages.

S. A. Mujaba, "IEEE P802.11a-1999 (Supplement to IEEE Std 802.11-1999)" Supplement to IEEE Standard for Information technology—Telecommunications and information exchange between systems—Local and metropolitan area networks—Specific requirements—Part 11: Wireless LAN Medium Access Control (MAC) and Physical Layer (PHY) Specifications; High-Speed Physical Layer in the 5 GHz Band, *"The Institute of Electrical and Electronics Engineer, Inc."* (1999).

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005; 131 Pages.

(56) References Cited

OTHER PUBLICATIONS

Search Report for Chinese Application No. 2012800240095 dated Nov. 12, 2015; 2 pages.
Second Office Action in corresponding European Patent Application No. 08 782 054.4 dated Feb. 3, 2011.
Shao, "Channel Selection for 802.11ah," doc.: IEEE 802.11-12/0816r0, pp. 1-11 (Jul. 2012).
Shi et al., "Phase Tracking During VHT-LTF," doc. No. IEEE 802.11-10/0771r0, The Institute of Electrical and Electronics Engineers, Jul. 2010; 19 Pages.
Specification of the Bluetooth System—Specification vol. 0; Master Table of Contents & Compliance Requirements; Covered Core Package version: 2.0+EDR; Current Master TOC issued: Nov. 4, 2004; Part A, pp. 1-74; vol. 1, pp. 1-92; vol. 2 & 3, pp. 1-814; vol. 4, pp. 1-250.
Stacey et al., "IEEE P802.11, Wireless LANs Proposed Tgac Draft Amendment," The Institution of Electrical and Electronics Engineers, Inc., doc. No. IEEE 802.11-10/1361r3; Jan. 2011; 154 Pages.
Stacey et al., "Specification Framework for Tgac," document No. IEEE 802.11-09-0992r20, The Institution of Electrical and Electronics Engineers, Inc., Jan. 18, 2011 pp. 1-49.
Syafei et al., "A Design of Next Generation Gigabit MIMO Wireless LAN System," IEEE 12th Int'l Conference on Advanced Communication Technology (ICACT 2010), The Institute of Electrical and Electronics Engineers 2010; pp. 941-946.
Syafei et al., "A Gigabit MIMO WLAN System with International Standardization Strategy," IEEE Int'l Symposium on Intelligent Signal Processing and Communication Systems (ISPACS 2009), The Institute of Electrical and Electronics Engineers, Dec. 7, 2009; pp. 228-231.
Syafei et al, "Design of 1.2 Gbps MIMO WLAN System for 4K Digital Cinema Transmission," IEEE 20th Int'l Symposium on Personal, Indoor and Mobile Radio Communications (PIMRC 2009), The Institute of Electrical and Electronics Engineers, 2009; pp. 207-211.
Taghavi et al., "Introductory Submission for Tgah", doc No. IEEE 802.11-11/0062r0, Institute for Electrical and Electronics Engineers, pp. 1-5 (Jan. 14, 2011); 6 Pages.
The International Search Report and the Written Opinion of the International Searching Authority, or the Declaration mailed Mar. 11, 2003 for International Application No. PCT/US2008/070469 filed Jul. 18, 2008; 15 Pages.
U.S. Appl. No. 13/689,183, al., "(WLAN) Packets with Midambles,", filed Nov. 29, 2012.
U.S. Appl. No. 13/689,223, Zhang, et al., "Long Wireless Local Area Network (WLAN) Packets with Midambles,", filed Nov. 29, 2012.
U.S. Appl. No. 13/689,244, Zhang, et al., "Long Wireless Local Area Network (WLAN) Packets with Midambles,", filed Nov. 29, 2012.

Van Nee et al., "The 802.11n MIMO-OFDM Standard for Wireless LAN and Beyond," Wireless Personal Communications, vol. 37 pp. 445-453 (2006).
van Zelst et al., "Pilot Sequence for VHT-DATA," doc. No. IEEE 802.11-10/0811r1, The Institute of Electrical and Electronics Engineers, Jul. 2010; 10 Pages.
Vermani, et al. "Preamble Format for 1 MHz," The Institute of Electrical and Electronics Engineers, doc. No. IEEE 802.11-11/1482r2, (Nov. 2011).
Vermani, et al. "Spec Framework Text for PHY Numerology," The Institute of Electrical and Electronics Engineers, doc. No. IEEE 802.11-11/1311 rO, (Sep. 2011).
Yu, et al. "Coverage extension for IEEE802.11 ah," The Institute of Electrical and Electronics Engineers, doc. No. IEEE 802.11-11/0035r1, (Jan. 2011).
Zhang et al., "11 ah Data Transmission Flow," The Institute of Electrical and Electronics Engineers, doc. No. IEEE 802.11-11/1484r1, (Nov. 2011); 15 Pages.
Zhang et al., "1MHz Waveform in Wider BW", The Institute of Electrical and Electronics Engineers, doc. No. IEEE 802.11-12/0309r1, (Mar. 2012).
Zhang et al., "Beamforming Feedback for Single Stream," The Institute of Electrical and Electronics Engineers, doc. No. IEEE 802.11-12/1312r0, pp. 1-22 (Nov. 12, 2012).
Christian Hoymann, et al.; "Evaluation of Grouping Strategies for and Hierarchical SDMA/TDMA Scheduling Process"; 2007 IEEE International Conference on Communications; Jun. 28, 2007; pp. 5616-5621.
Notice of Allowance in U.S. Appl. No. 13/689,244, dated Aug. 21, 2015 (7 pages).
Notice of Allowance in U.S. Appl. No. 13/689,244, dated Jan. 13, 2016 (7 pages).
Office Action in U.S. Appl. No. 13/689,183, dated Mar. 3, 2016 (28 pages).
Office Action in U.S. Appl. No. 13/689,223, dated Mar. 31, 2016 (14 pages).
Organized translation of Notice of Reasons for Rejection for Japanese Application No. 2015-218535 issued Aug. 9, 2016; 2 pages.
Shinji Murai, et al.; "Wireless Resource Allocation Methods Based on QoS in MIMO-SDMA/TDMA Systems"; The Institute of Electronics, Information and Communication Engineers (IEICE) Technical Report; vol. 106, No. 168; RCS2006-65; Jul. 12, 2006; pp. 37-42.
Communication pursuant to Article 94(3) EPC in European Patent Application No. 12703655.6, dated Aug. 8, 2016 (8 pages).
Notice of Allowance in U.S. Appl. No. 13/477,920, dated Jun. 6, 2014 (7 pages).
Notice of Allowance in U.S. Appl. No. 13/477,920, dated Sep. 18, 2014 (7 pages).
Second Office Action in Chinese Application No. 201280014281.5, dated Mar. 8, 2015, with English translation (6 pages).
Supplemental Notice of Allowability in U.S. Appl. No. 13/477,920, dated Jul. 15, 2014 (4 pages).

* cited by examiner

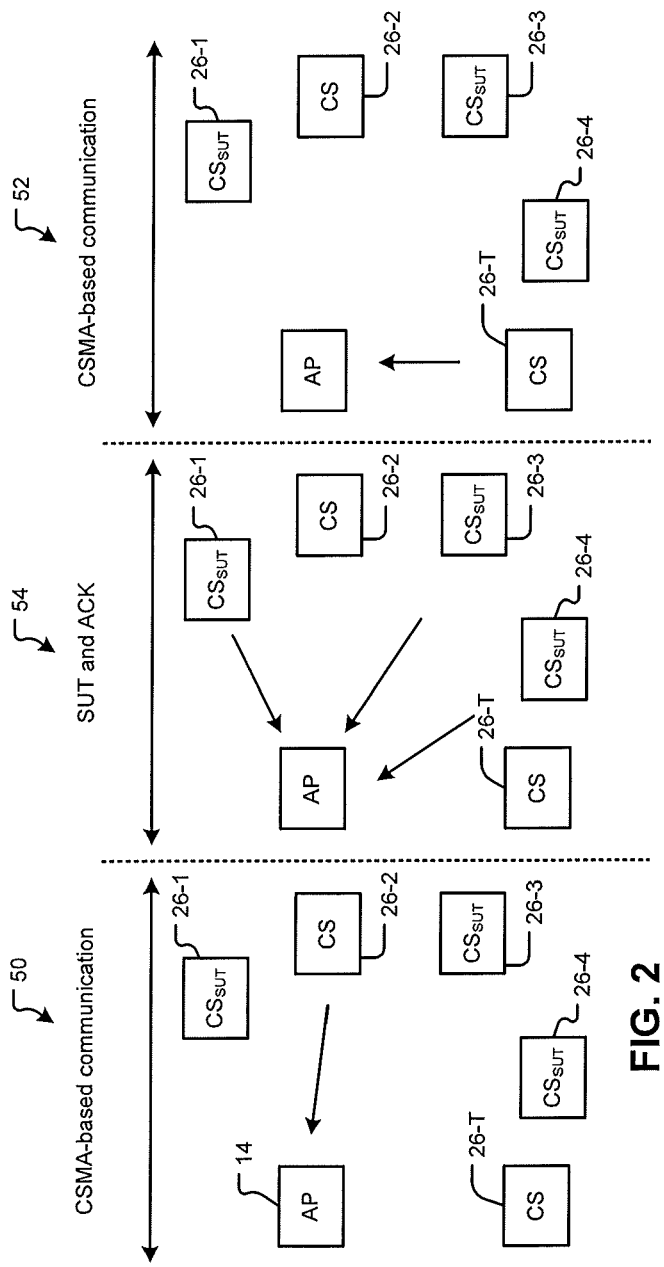
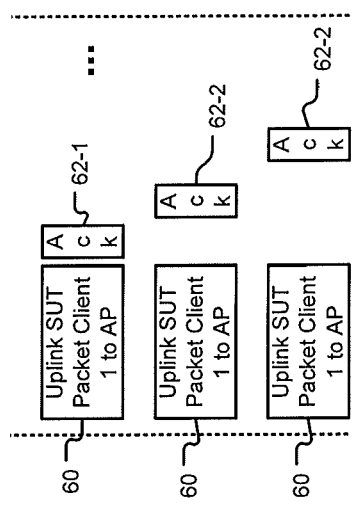
FIG. 2
FIG. 3

AGGREGATING ACKNOWLEDGMENTS TRANSMITTED BY AN ACCESS POINT TO A PLURALITY OF CLIENT STATIONS IN A WIRELESS NETWORK

CROSS-REFERENCE TO RELATED APPLICATIONS

This application is a continuation of U.S. application Ser. No. 14/619,652, filed on Feb. 11, 2015, which is a continuation of U.S. application Ser. No. 13/428,282 (now U.S. Pat. No. 8,958,436), filed on Mar. 23, 2012, which is a continuation of U.S. application Ser. No. 12/175,501 (now U.S. Pat. No. 8,149,811), filed on Jul. 18, 2008, which claims the benefit of U.S. Provisional Application No. 60/950,494, filed on Jul. 18, 2007 and U.S. Provisional Application No. 61/057,644, filed on May 30, 2008. The disclosures of U.S. application Ser. Nos. 14/619,652, 13/428,282, U.S. Provisional Application No. 60/950,494, and U.S. Provisional Application No. 61/057,644 are incorporated herein by reference in their entirety.

FIELD

The present disclosure relates to wireless networks, and more particularly to wireless networks with simultaneous uplink transmission of independent data from multiple wireless client stations to an access point.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

When operating in an infrastructure mode, Wireless Local Area Networks (WLANs) typically include an access point (AP) and one or more client stations. Development of WLAN standards such as IEEE §§802.11a/b/g/n has focused primarily on improving single-user peak data throughput. For example, IEEE §802.11b operate at a single-user peak throughput of 11 Mbps, IEEE §802.11a/g operates at a single-user peak throughput of 54 Mbps, and IEEE §§802.11n operates at a single-user peak throughput of 600 Mbps.

In these WLANs, the AP transmits information to one client station at a time in a unicast mode. Alternatively, the same information may be transmitted to a group of client stations concurrently in a multicast mode. This approach reduces network efficiency because other client stations need to wait until the current client station or group of client stations is serviced. When transmitting the same information to the group of client stations, throughput may be limited by one of the client stations with the weakest reception.

For uplinks, the client stations typically contend for access to the medium. In other words, only one client station may transmit uplink data to the AP at a time. For example, the client stations may contend for the channel using Carrier Sense Multiple Access (CSMA). One client station may transmit when there are no other client stations transmitting. When a client station detects activity, the client station waits a random backoff period before retrying. This approach is inefficient for several reasons. Uplink transmission cannot be guaranteed to occur within a particular time frame. In addition, inefficiency tends to increase as the number of client stations increases.

SUMMARY

A wireless network comprises R client stations that respectively generate simultaneous uplink transmission (SUT) data, where R is an integer greater than one. An access point (AP) receives SUT data from each of the R client stations during an SUT period.

In other features, the R client stations transmit the SUT data synchronously to the AP during the SUT period. The AP adjusts a transmit power level of one or more of the R client stations based on corresponding transmit power levels received by the AP. D legacy client stations are not SUT enabled. The AP prevents the D client stations from transmitting during the SUT period. The R client stations transmit the SUT data asynchronously to the AP during the SUT period. Each of the R client stations transmits the SUT data to the AP during the SUT period using a different spreading-sequence code. Each of the R client stations transmits the SUT data to the AP during the SUT period using a different portion of bandwidth. Each of the R client stations transmit the SUT data to the AP at different times during the SUT period. The AP sequentially transmits acknowledgements to the R client stations in a non-overlapping manner during the SUT period.

A client station comprises a physical layer (PHY) module and a medium access control (MAC) module that communicates with the PHY module and that transmits simultaneous uplink transmission (SUT) data to an access point (AP) during a SUT period. Other client stations associated with the AP transmit other SUT data to the AP during the SUT period.

In other features, the client station transmits the SUT data synchronously with transmission of the other SUT data from the other client stations. A power level adjustment module adjusts a transmit power level of the client station based on data received from the AP. The client station transmits asynchronously with respect to the other client stations during the SUT period. The client station transmits during the SUT period using a different spreading-sequence code than the other client stations. The client station transmits during the SUT period using a different portion of bandwidth than the other client stations. The client station transmits at different times than the other client stations during the SUT period.

A client station comprises physical layer (PHY) means for providing an interface to a medium and medium access control (MAC) means for communicating with the PHY means and for transmitting simultaneous uplink transmission (SUT) data to an access point (AP) during a SUT period. Other client stations associated with the AP transmit other SUT data to the AP during the SUT period.

In other features, the client station transmits the SUT data synchronously with transmission of the other SUT data from the other client stations. Power level adjustment means adjusts a transmit power level of the client station based on data received from the AP. The client station transmits asynchronously with respect to the other client stations during the SUT period. The client station transmits during the SUT period using a different spreading-sequence code than the other client stations. The client station transmits during the SUT period using a different portion of bandwidth than the other client stations. The client station transmits at different times than the other client stations during the SUT period.

A method for operating a wireless network comprises generating simultaneous uplink transmission (SUT) data using R client stations, where R is an integer greater than one and receiving SUT data from each of the R client stations at an access point (AP) during an SUT period.

In other features, the method includes transmitting the SUT data synchronously to the AP during the SUT period. The AP adjusts a transmit power level of one or more of the R client stations based on corresponding transmit power levels received by the AP. D legacy client stations are not SUT enabled. The method includes preventing the D client stations from transmitting during the SUT period. The method includes transmitting the SUT data asynchronously to the AP during the SUT period. The method includes transmitting the SUT data to the AP during the SUT period using a different spreading-sequence code. The method includes transmitting the SUT data to the AP during the SUT period using a different portion of bandwidth. The method includes transmitting the SUT data to the AP at different times during the SUT period. The method includes sequentially transmitting acknowledgements to the R client stations in a non-overlapping manner during the SUT period.

An access point comprises a physical layer module. W signal processing modules communicate with the physical layer module and receive simultaneous uplink transmission (SUT) data from R client stations during an SUT period, where W and R are integers greater than one.

In other features, the R client stations transmit the SUT data to the access point synchronously. The access point adjusts a power level of the R client stations. The access point associates with D legacy client stations that are not SUT enabled, wherein D is an integer greater than zero. The access point prevents the D legacy client stations from transmitting during the SUT period. The R client stations transmit asynchronously during the SUT period. Each of the R client stations transmit to the access point during the SUT period using a different spreading-sequence code. Each of the R client stations transmit to the access point during the SUT period using a different portion of bandwidth. Each of the R client stations transmit to the access point at different times during the SUT period. The access point sequentially transmits acknowledgements to the R client stations in a non-overlapping manner.

A method for operating an access point comprises providing W signal processing modules; and receiving simultaneous uplink transmission (SUT) data from R client stations during an SUT period, where W and R are integers greater than one.

In other features, the method includes transmitting the SUT data to the access point synchronously. The method includes adjusting a power level of the R client stations. The method includes associating with D legacy client stations that are not SUT enabled, wherein D is an integer greater than zero. The method includes preventing the D legacy client stations from transmitting during the SUT period.

In other features, the R client stations transmit asynchronously during the SUT period. Each of the R client stations transmit to the access point during the SUT period using a different spreading-sequence code. Each of the R client stations transmit to the access point during the SUT period using a different portion of bandwidth. Each of the R client stations transmit to the access point at different times during the SUT period. The method includes sequentially transmitting acknowledgements to the R client stations in a non-overlapping manner.

An access point comprises physical layer means for providing an interface to a medium. W signal processing means communicate with the physical layer means and receive simultaneous uplink transmission (SUT) data from R client stations during an SUT period, where W and R are integers greater than one.

In other features, the R client stations transmit the SUT data to the access point synchronously. The access point adjusts a power level of the R client stations. The access point associates with D legacy client stations that are not SUT enabled, wherein D is an integer greater than zero. The access point prevents the D legacy client stations from transmitting during the SUT period. The R client stations transmit asynchronously during the SUT period. Each of the R client stations transmit to the access point during the SUT period using a different spreading-sequence code. Each of the R client stations transmit to the access point during the SUT period using a different portion of bandwidth. Each of the R client stations transmit to the access point at different times during the SUT period. The access point sequentially transmits acknowledgements to the R client stations in a non-overlapping manner.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 2 is a timing diagram illustrating legacy windows and a simultaneous uplink transmission (SUT) window;

FIG. 3 is a timing diagram illustrating an uplink SUT packet and acknowledgments;

DESCRIPTION

Figure 1:
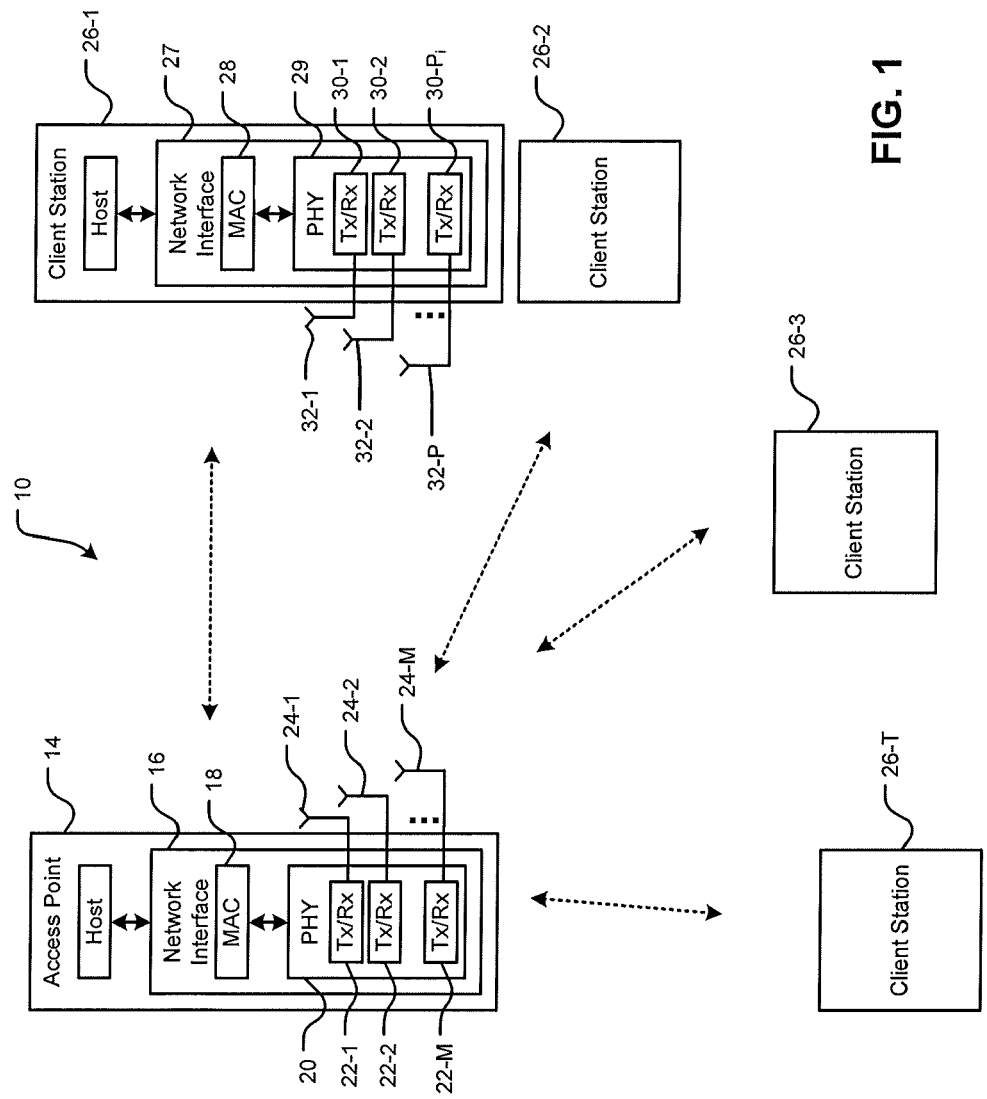
FIG. 1 is a functional black diagram of a WLAN including an access point (AP) and one or more client stations.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory (shared, dedicated, or group) that execute one or more software or firmware programs, a combinational logic circuit, and/or other suitable components that provide the described functionality.

According to the present disclosure, multiple client stations transmit uplink data to an access point (AP) at the same time (hereinafter simultaneous uplink transmission (SUT)). To accomplish this, the AP includes multiple antennas and the client stations may include one or more antennas.

When two or more of the client stations simultaneously transmit data to the AP, transmissions may be synchronous or asynchronous. Timing of synchronous transmission may be controlled by the AP. Alternatively, transmissions may be asynchronous within an SUT period. This approach translates into an increased number of client stations serviced by a single AP. This, in turn, provides significant economic and end-user advantages. For example only, this approach may be used in conjunction with Orthogonal Frequency Division Multiplexing (OFDM) or with other suitable modulation schemes.

During an SUT period, the AP receives a superposition of transmitted signals from SUT-enabled client stations. For synchronous uplink OFDM transmission, the AP uses multiple antennas to separate and detect the individual transmitted signals from each SUT-enabled client station reliably. Increasing the number of antennas at the AP may tend to increase the number of SUT-enabled client stations that can simultaneously be detected.

For asynchronous uplink transmission, additional signal separation may be required. When asynchronous uplink transmission is used, the AP may assign each of the SUT-enabled client stations one or more of the following: a spreading-sequence (i.e., code) to each user; different portions of bandwidth to transmit; and/or different portions of time within the SUT period for transmission.

When the SUT-enabled client stations transmit simultaneously within a given SUT period, receive power for the client stations that are located close to the AP may be higher than other client stations located further from the AP. Without power adjustment, variations in power levels may tend to degrade reception quality for client stations that are farther away. According to the present disclosure, in one implementation, the AP and client stations use power control to improve uniformity of reception quality across client stations.

Implementing SUT-enabled APs and clients stations requires appropriate modifications to the APs and the client stations. The APs and client stations may still be compatible with IEEE §§802.11n/a/b/g to allow communications with legacy client stations. SUT transmissions (e.g., SUT frames) may have a format compatible with those associated with legacy client stations to allow the legacy client stations to detect SUT frames.

The AP may also designate a protected SUT period during which SUT transmissions are conducted between SUT-enabled client stations and the AP. During the SUT period, other network devices are instructed to not transmit data. For example only, the SUT period may be designated by the AP using various Medium Access Control (MAC) mechanisms in current WLAN specifications. Acknowledgements (ACKs) may be transmitted during the SUT period by the AP to the SUT-enable client stations that are transmitting data.

As discussed above, the AP may adjust the transmit power levels of the client stations. The AP may send transmit power level data to the client stations associated with the AP, e.g., during association, network entry handshake, periodically, on an event basis or at other times.

Referring now to FIG. 1, an exemplary wireless local area network (WLAN) 10 is shown. The WLAN 10 includes an access point (AP) 14. The AP 14 includes a network interface 16 including a medium access control (MAC) module 18, a physical layer (PHY) module 20, M transceivers 22-1, 22-2, ..., 22-M, and M antennas 24-1, 24-2, ..., 24-M (collectively antennas 24), where M is an integer greater than one.

The WLAN 10 is associated with T client stations 26-1, 26-2, ..., 26-T (collectively client stations 26), where T is an integer greater than one. R of the T client stations 26 are SUT enabled, and (T-R) of the T client stations 26 may be legacy client stations that are not SUT enabled, where R is an integer less than or equal to T.

Each of the T client stations 26 may include a network interface 27 including a MAC module 28, a PHY module 29, $P_i$ transceivers 30-1, 30-2, ..., 30-$P_i$, and $P_i$ antennas 32-1, 32-2, ..., 32-$P_i$, where $P_i$ is an integer greater than zero, and i corresponds to an $i^{th}$ one of the T client stations 26. Each f the T client stations 26 may have different numbers of transceivers and antennas.

Referring now to FIGS. 2 and 3, exemplary legacy windows and SUT windows are shown. The legacy client stations may transmit or receive data to/from the AP 14 during legacy windows 50, 52. For example, the legacy windows 50, 52 may be CSMA windows.

During an SUT window 54, multiple SUT enabled client stations (for example, client stations 26-1, 26-3, 26-4 in FIG. 2) send SUT data 60-1, 60-2, ..., 60-B to the AP 14 during a first part of the SUT period. During a second part of the SUT period, the AP 14 sends acknowledgements to the SUT enabled client stations 26-1, 26-3, 26-4 at spaced intervals. During the SUT window 54, other network devices (e.g., legacy client stations) are unable to transmit data. Time sufficient for the SUT window 54 may be arranged with the legacy client stations using MAC mechanisms provided by existing WLAN specifications.

While staggered ACKs are shown, there are other ways of transmitting the ACKs to the SUT-enabled client stations. For example, instead of staggered ACKs, a single encoded ACK may be transmitted. The single encoded ACK may be decodable by SUT-enabled clients. For example only, the single encoded ACK message may include MAC addresses for each of the client stations whose messages were successfully received.

Alternately, the ACKs may be aggregated and specially encoded in one single aggregated packet (frame). Each sub-frame of the aggregated frame includes one ACK with similar content as the staggered ACKs.

Multiple ACKs may be simultaneously transmitted on the downlink using simultaneous downlink transmission (SDT). In other words, each ACK message may be multiplied by a different steering matrix W that is tailored for the channel between the AP and the respective client station. The multiple ACKs may be summed and transmitted by the AP. Additional details relating to SDT transmission from the AP may be found in U.S. patent application Ser. No. 12/175, 526, filed on Jul. 18, 2008 (now U.S. Pat. No. 8,144,647 issued on Mar. 27, 2012), which is hereby incorporated by reference in its entirety.

In FIG. 3, the uplink SUT data 60-1, 60-2, . . . 60-B may be followed by a period of acknowledgments (ACKs) 62-1, 62-2, . . . 62-X (collectively ACKs 62) sent by the AP 14 to SUT-enabled client stations 26 that sent data during the SUT window 54.

Figure 4:
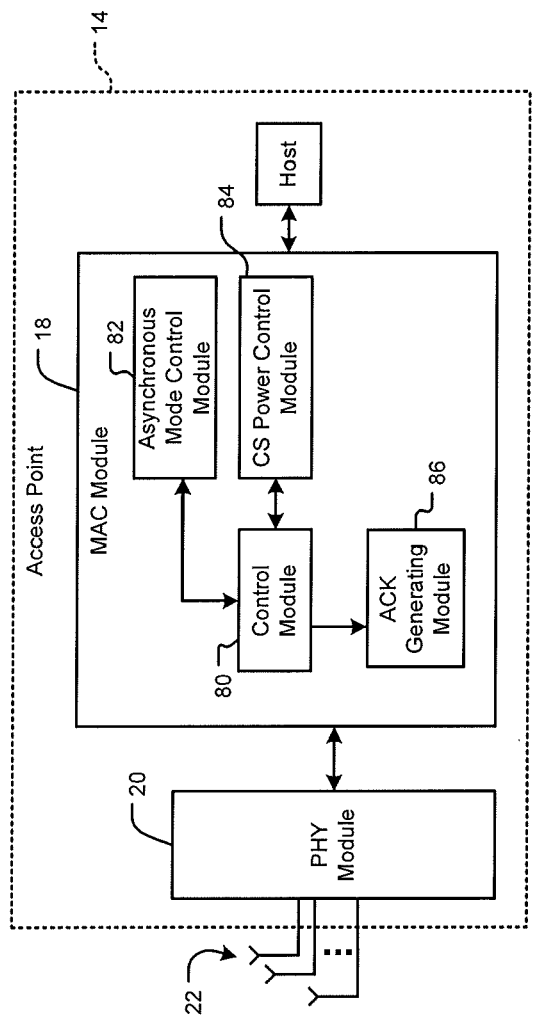
FIG. 4 is a functional block diagram of an exemplary AP.

Referring now to FIG. 4, an exemplary AP 14 is shown to include the MAC module 18 and the PHY module 20. The MAC module 18 includes a control module 80 that performs control-related operation of the MAC module 18. The control module 80 communicates with an asynchronous mode control module 82 that enables and disables asynchronous mode operation of the AP 14 and the client stations 26. The asynchronous mode control module 82 generates configuration data for configuring the SUT-enabled client stations and causes the configuration data to be sent to the SUT-enabled client stations. When the asynchronous mode is enabled by the AP, the asynchronous mode control module 82 may selectively assign the SUT-enabled client stations one or more of the following: a spreading-sequence (i.e., code) to each user; different portions of bandwidth to transmit; and/or different portions of time within the SUT period for transmission. The asynchronous mode control module 82 also enables the AP 14 to receive asynchronous signals from multiple client stations. Alternately, the SUT-enabled client stations may be preconfigured or configured from the client side. In this case, the SUT-enabled client stations may send configuration data to the AP 14.

The control module 80 also communicates with a client station (CS) power control module 84 that coordinates transmit power levels of the SUT-enabled client stations. In other words, the CS power control module 84 measures receive power levels of each of the SUT-enabled client stations and selectively adjusts one or more of transmit power levels for the SUT-enabled client stations. In other words, the AP 14 may adjust the power levels such that each SUT-enabled client station has approximately the same receive power levels at the AP 14.

The control module 80 also communicates with an acknowledgement (ACK) generating module 86. The ACK generating module 86 generates ACKs at spaced time intervals during the SUT period for each of the SUT-enabled client stations that sent SUT data.

Figure 5:
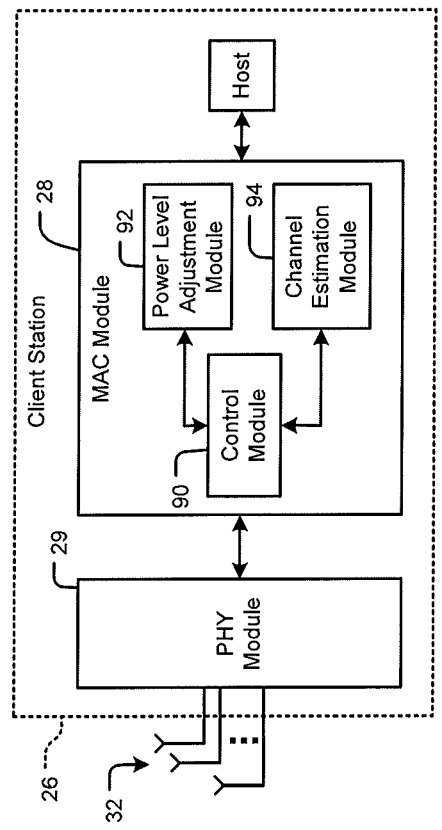
FIG. 5 is a functional block diagram of an exemplary client station.

Referring now to FIG. 5, an exemplary client station is shown to include the MAC module 28 and the PHY module 29. The MAC module 28 includes a control module 90 that performs control-related operation of the MAC module 28. The control module 90 communicates with a power level adjustment module 92, which may be implemented in the MAC module 28 or the PHY module 29. The power level adjustment module 92 receives transmit power data from the AP 14 and sets a transmit power level of the client station accordingly.

The control module 90 also communicates with an asynchronous mode configuration module 94 that configures the client station to operate in an asynchronous mode. For example, the asynchronous mode configuration module 94 selectively configures the client station to use one or more of the following: a predetermined spreading-sequence (i.e., code); a predetermined portion of bandwidth to transmit; and/or a predetermined portion of time within the SUT period for transmission.

Figure 6A:
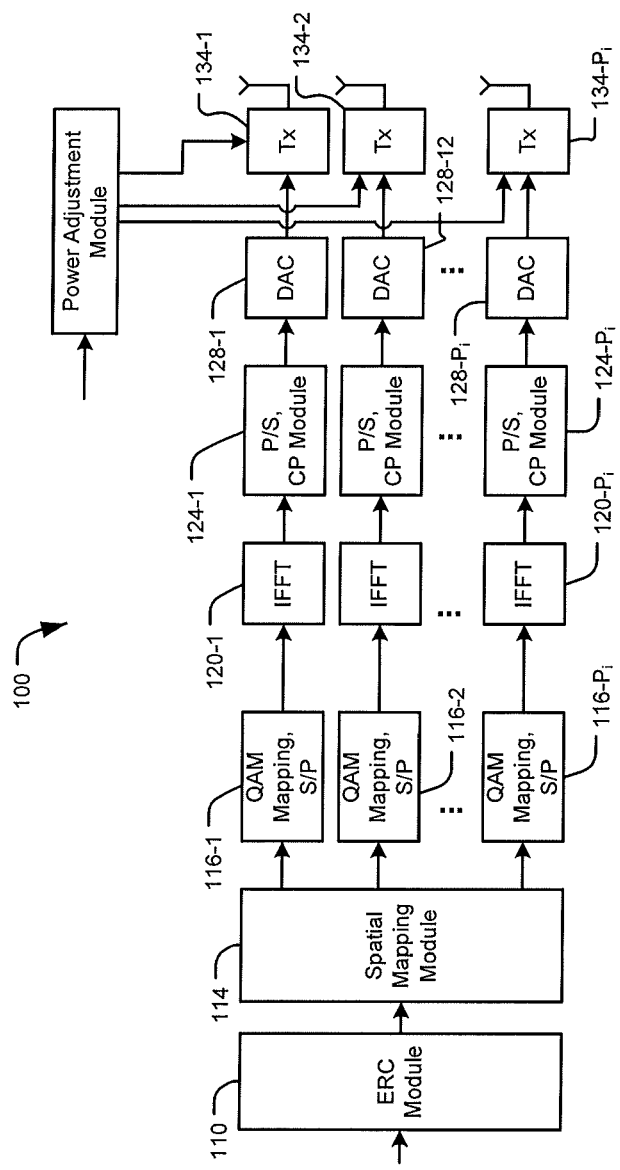
FIG. 6A is a functional block diagram of an exemplary transmit path of an exemplary client station.
Figure 6B:
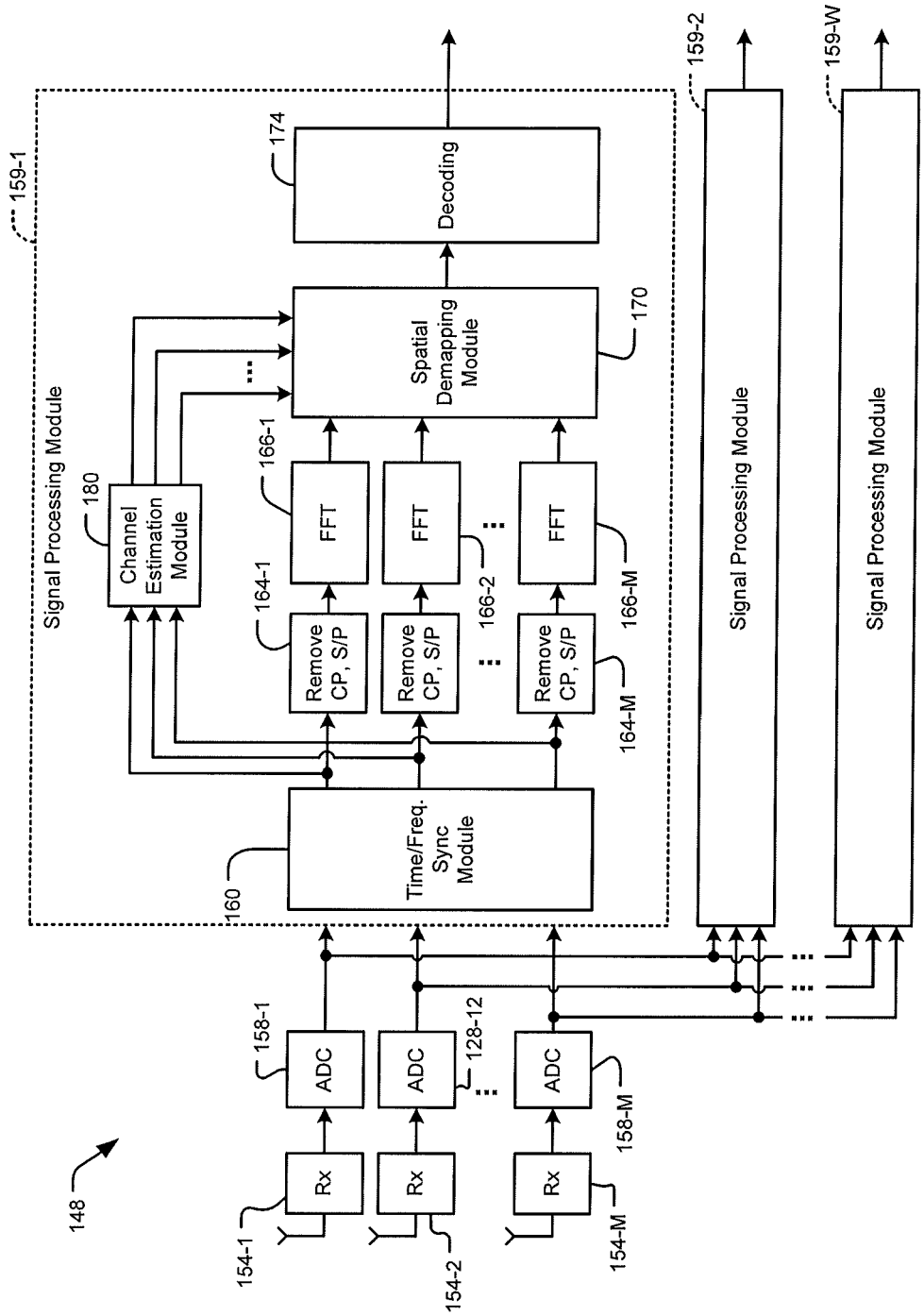
FIG. 6B is a functional block diagram of an exemplary receive path of an exemplary AP.

Referring now to FIGS. 6A and 6B, exemplary transmit and receive paths for the client stations and AP are shown, respectively. Skilled artisans will appreciate that there are a number of different ways to implement the foregoing wireless network in addition to those described herein and that the foregoing are merely examples. In FIG. 6A, an exemplary transmit path 100 of the client station is shown. The transmit path 100 includes encoder module 110 that receives a bit stream. The encoder module 110 outputs an encoded bit stream to a spatial mapping module 114, which performs spatial mapping.

Outputs of the spatial mapping module 114 are input to quadrature amplitude modulation (QAM) mapping modules 116-1, 116-2, . . . , and 116-$P_i$ (collectively QAM mapping modules 118), which perform QAM and serial-to-parallel (S/P) conversion. The QAM mapping modules 116 output OFDM tones that are input to inverse Fast Fourier Transform (IFFT) modules 120-1, 120-2, . . . , 120-$P_i$ (collectively IFFT modules 120). Outputs of the IFFT modules 120 are input to a parallel-to-serial (P/S) converter and cyclic prefix modules 124-11, 124-12, . . . , 124-$P_i$ (collectively P/S and CP modules 124). Outputs of the P/S and CP modules 124 are input to digital-to-analog converters (DACs) 128-1, 128-2, . . . , and 128-$P_i$ (collectively DACs 128) and then to transmitters 134-1, 134-2, . . . , and 134-$P_i$ and associated $P_i$ antennas.

In FIG. 6B, a receive path 148 comprises receivers 154-1, 154-2, . . . 154-M (collectively receivers 154) that communicate with analog to digital converters (ADCs) 158-1, 158-2, . . . , and 158-M (collectively ADCs 158). Outputs of the ADCs 158 are input to signal processing modules 159-1, 159-2, . . . , and 159-W (collectively signal processing modules 159). Other signal processing modules 159-2, . . . , and 159-W are configured for other client stations. The signal processing modules 159 may be configured by the MAC module to recover signals from one of the client stations.

The signal processor 159-1 includes a time/frequency synchronization module 160, which estimates and corrects for frequency offset and retrieves symbol timing for one of the client stations. Outputs of the time/frequency synchronization module 160 are input to cyclic prefix (CP) and serial to parallel (S/P) converting modules 164-1, 164-2, . . . , and 164-M (collectively CP and S/P modules 164). Outputs of the CP and S/P modules 164 are input to Fast Fourier Transform modules 166-1, 166-2, . . . , and 166-M (collectively FFT 166), which perform FFT. Outputs of the FFT modules 166 are input to a spatial demapping module 170, which performs spatial demapping. Outputs of the spatial demapping module 170 are input to a decoder 174.

Figure 7A:
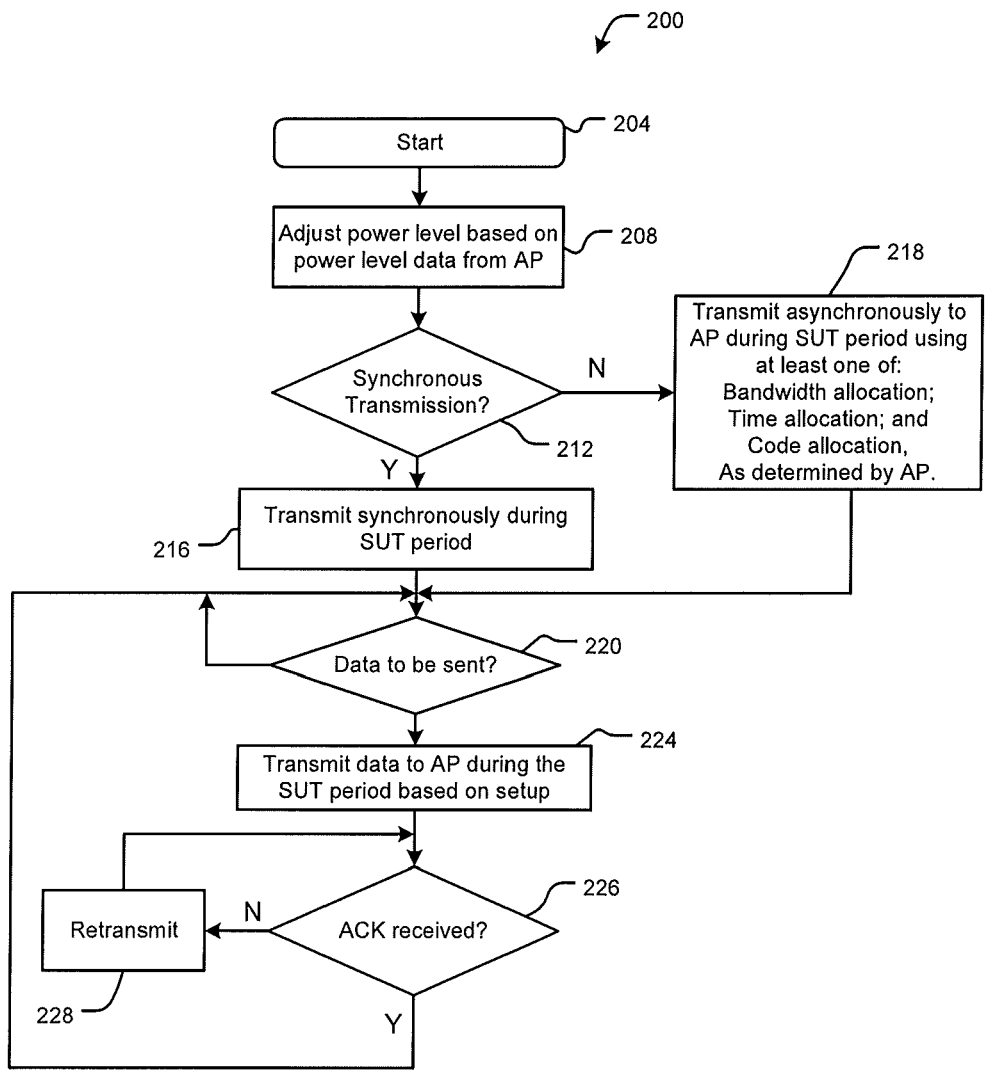
FIG. 7A illustrates an exemplary method for operating an exemplary client station.

Referring now to FIG. 7A, a method 200 for operating a client station (e.g., the client station of FIG. 5) is shown. Control begins with step 204. In step 208, control adjusts a transmit power level based on data from the AP. The power level can be adjusted initially when the client station associates with the AP, at periodic intervals and/or when certain events occur. In FIG. 7A, power is adjusted initially.

For example, the power level may be checked at periodic intervals. If the power level remains about the same (e.g., within a predetermined range of an initial value), the time interval for checking the power level can be increased. This situation may correspond to a client station that is not moving very frequently such as a desktop computer. Conversely, if the power level varies more, the time interval for checking the power level can be reduced. This situation may correspond to a client station that is moving, such as a laptop that is moved. Event-based power level adjustment may also be performed.

In step 212, the client station determines whether synchronous transmission is enabled. If step 212 is true, the (SUT-enabled) client station transmits synchronously during an SUT period based on timing data from the AP. Otherwise, the client station transmits asynchronously to the AP during the SUT period using at least one of bandwidth allocation, time allocation and/or code allocation. The client station may be set up by the AP, by the user, or preset.

Control determines whether there is data that is ready to be sent by the client station to the AP in step 220. If step 220 is true, control sends the data based on the setup described above in step 224. After sending data, the client station determines whether an ACK is received in step 226. If step 226 is true, control returns to step 220. If step 226 is false, the client station may retransmit in step 228 and then control returns to step 226.

Figure 7B:
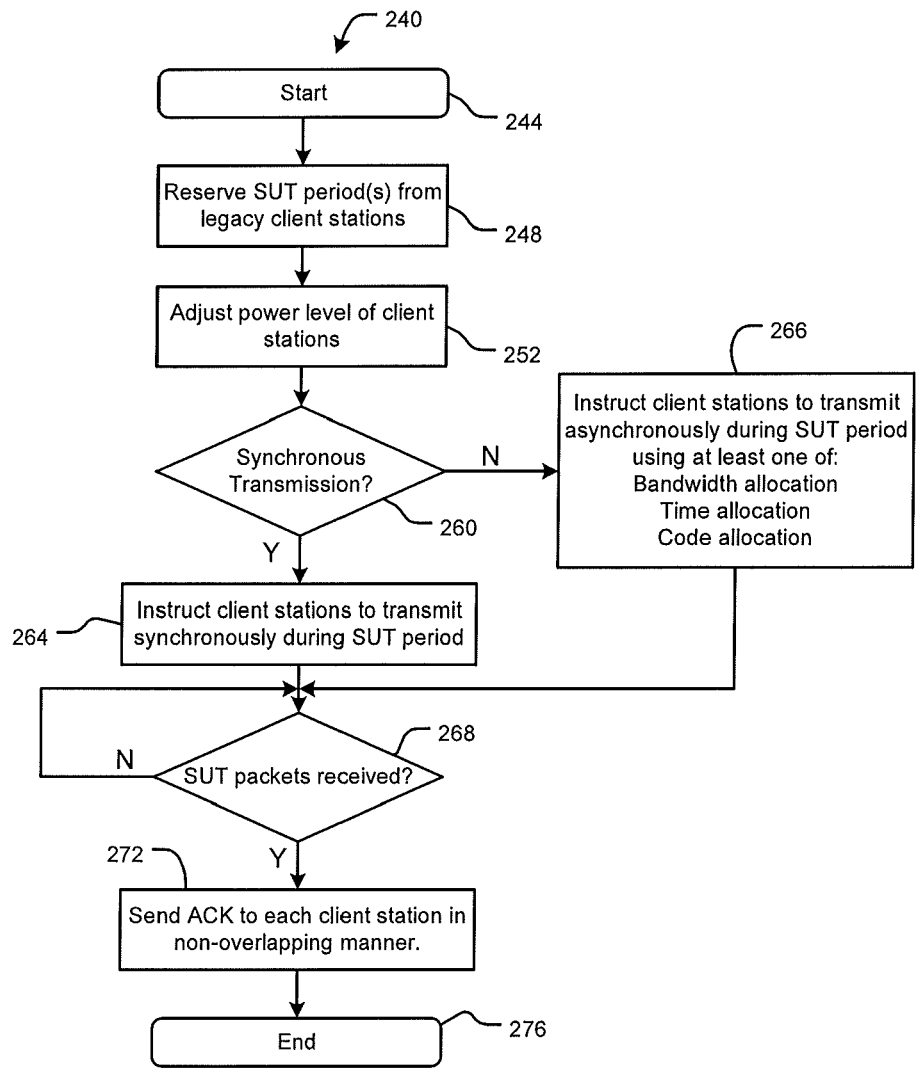
FIG. 7B illustrates an exemplary method for operating an exemplary AP.

Referring now to FIG. 7B, a method 240 for operating an AP (e.g, AP 14) is shown in further detail. Control begins with step 244. In step 248, the AP reserves SUT periods from legacy client stations as needed. In step 252, the AP adjusts the power levels of the client stations relative to each other based on corresponding receive power levels. In step 260, the AP determines whether synchronous transmission will be used. If step 260 is true, the AP instructs SUT-enabled client stations to transmit synchronously during the SUT period.

Alternately, if asynchronous transmission will be used, the AP instructs the SUT-enabled client stations to transmit asynchronously during the SUT period using at least one of bandwidth allocation, time allocation and code allocation in step 266. In step 268, control determines whether SUT data is received during the SUT period. If step 268 is true, the AP sends an ACK to the SUT-enabled client stations in step 272 as described above. Control ends in step 276.

The present disclosure uses several concepts to improve uplink transmission efficiency. According to the present disclosure, multiple client stations may transmit simultaneously to the AP. The client stations can transmit either synchronously or asynchronously. When asynchronous transmission is used, the client stations and AP increase the ability to separate signals through the use of bandwidth allocation, time allocation, and/or code allocation. In one implementation, the present disclosure also employs power control across client stations in conjunction with SUT to ensure a minimum quality of reception across client stations. In addition, in one implementation, the present disclosure employs a protected SUT period during which legacy client stations are blocked from transmitting.

Referring now to FIGS. 8A-8E, various exemplary implementations incorporating the teachings of the present disclosure are shown. The SUT-enabled network interfaces of the AP or the client stations described above can be integrated with other devices. Some exemplary devices are set forth below.

Figures 8A, 8B:
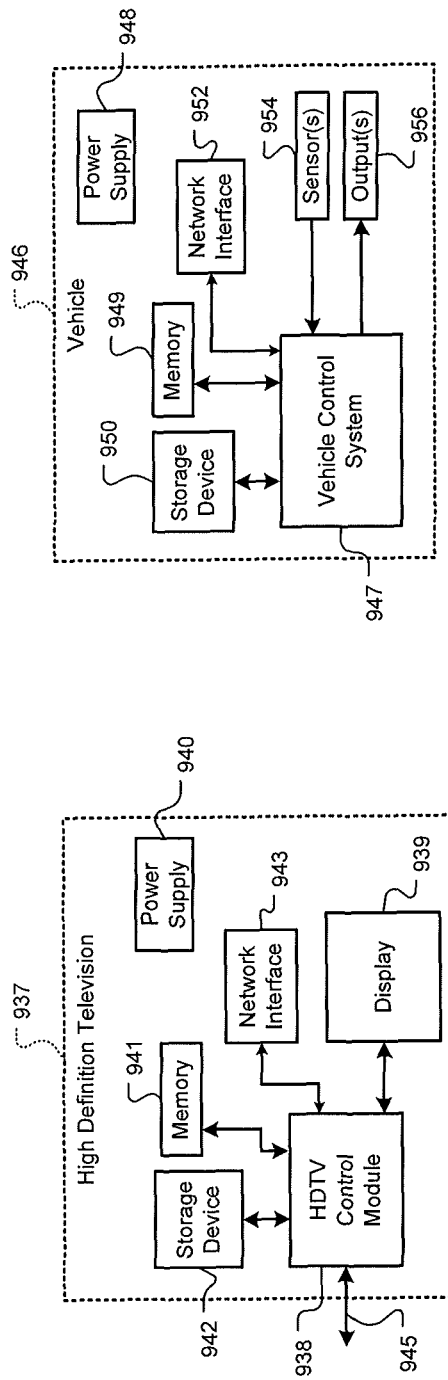
FIG. 8A is a functional block diagram of a high definition television.
FIG. 8B is a functional block diagram of a vehicle control system.

Referring now to FIG. 8A, the teachings of the disclosure can be implemented in a wireless network interface of a high definition television (HDTV) 937. The HDTV 937 includes an HDTV control module 938, a display 939, a power supply 940, memory 941, a storage device 942, a network interface 943, and an external interface 945. If the network interface 943 includes a wireless local area network interface, an antenna (not shown) may be included.

The HDTV 937 can receive input signals from the network interface 943 and/or the external interface 945, which can send and receive data via cable, broadband Internet, and/or satellite. The HDTV control module 938 may process the input signals, including encoding, decoding, filtering, and/or formatting, and generate output signals. The output signals may be communicated to one or more of the display 939, memory 941, the storage device 942, the network interface 943, and the external interface 945.

Memory 941 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 942 may include an optical storage drive, such as a DVD drive, and/or a hard disk drive (HDD). The HDTV control module 938 communicates externally via the network interface 943 and/or the external interface 945. The power supply 940 provides power to the components of the HDTV 937.

Referring now to FIG. 8B, the teachings of the disclosure may be implemented in a wireless network interface of a vehicle 946. The vehicle 946 may include a vehicle control system 947, a power supply 948, memory 949, a storage device 950, and a network interface 952. If the network interface 952 includes a wireless local area network interface, an antenna (not shown) may be included. The vehicle control system 947 may be a powertrain control system, a body control system, an entertainment control system, an anti-lock braking system (ABS), a navigation system, a telematics system, a lane departure system, an adaptive cruise control system, etc.

The vehicle control system 947 may communicate with one or more sensors 954 and generate one or more output signals 956. The sensors 954 may include temperature sensors, acceleration sensors, pressure sensors, rotational sensors, airflow sensors, etc. The output signals 956 may control engine operating parameters, transmission operating parameters, suspension parameters, brake parameters, etc.

The power supply 948 provides power to the components of the vehicle 946. The vehicle control system 947 may store data in memory 949 and/or the storage device 950. Memory 949 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 950 may include an optical storage drive, such as a DVD drive, and/or a hard disk drive (HDD). The vehicle control system 947 may communicate externally using the network interface 952.

Figure 8D:
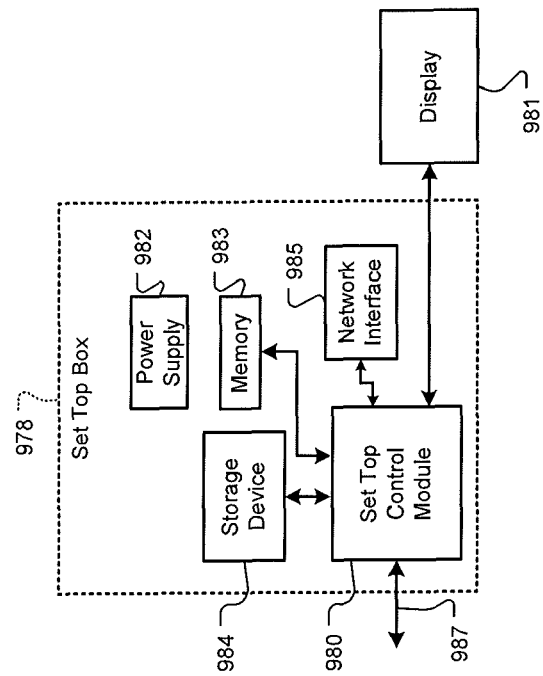
FIG. 8D is a functional block diagram of a set top box.
Figure 8C:
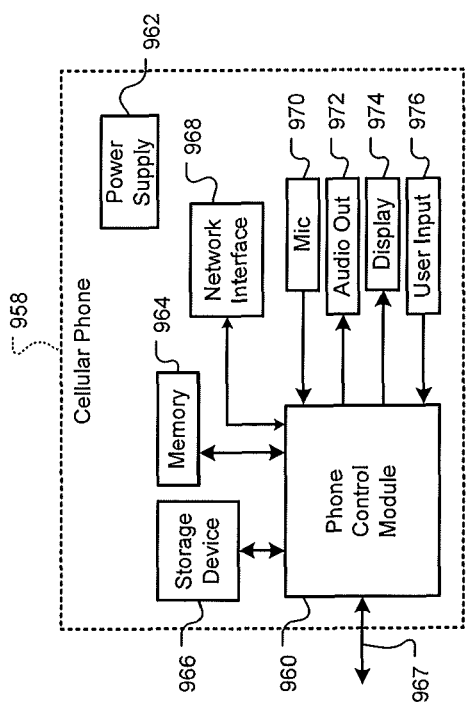
FIG. 8C is a functional block diagram of a cellular phone.

Referring now to FIG. 8C, the teachings of the disclosure can be implemented in a wireless network interface of a cellular phone 958. The cellular phone 958 includes a phone control module 960, a power supply 962, memory 964, a storage device 966, and a cellular network interface 967. The cellular phone 958 may include a network interface 968, a microphone 970, an audio output 972 such as a speaker and/or output jack, a display 974, and a user input device 976 such as a keypad and/or pointing device. If the network interface 968 includes a wireless local area network interface, an antenna (not shown) may be included.

The phone control module 960 may receive input signals from the cellular network interface 967, the network interface 968, the microphone 970, and/or the user input device 976. The phone control module 960 may process signals, including encoding, decoding, filtering, and/or formatting, and generate output signals. The output signals may be communicated to one or more of memory 964, the storage device 966, the cellular network interface 967, the network interface 968, and the audio output 972.

Memory 964 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 966 may include an optical storage drive, such as a DVD drive, and/or a hard disk drive (HDD). The power supply 962 provides power to the components of the cellular phone 958.

Referring now to FIG. 8D, the teachings of the disclosure can be implemented in a wireless network interface of a set top box 978. The set top box 978 includes a set top control module 980, a display 981, a power supply 982, memory 983, a storage device 984, and a network interface 985. If the network interface 985 includes a wireless local area network interface, an antenna (not shown) may be included.

The set top control module 980 may receive input signals from the network interface 985 and an external interface 987, which can send and receive data via cable, broadband Internet, and/or satellite. The set top control module 980 may process signals, including encoding, decoding, filtering, and/or formatting, and generate output signals. The output signals may include audio and/or video signals in standard and/or high definition formats. The output signals may be communicated to the network interface 985 and/or to the display 981. The display 981 may include a television, a projector, and/or a monitor.

The power supply 982 provides power to the components of the set top box 978. Memory 983 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 984 may include an optical storage drive, such as a DVD drive, and/or a hard disk drive (HDD).

Figure 8E:
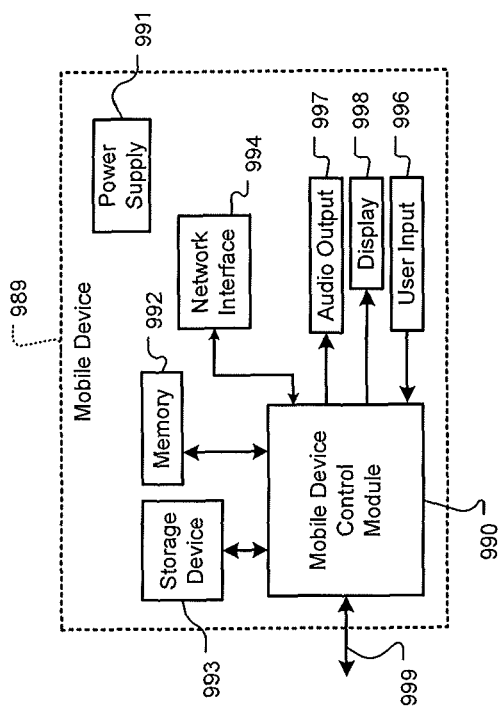
FIG. 8E is a functional block diagram of a mobile device.

Referring now to FIG. 8E, the teachings of the disclosure can be implemented in a wireless network interface of a mobile device 989. The mobile device 989 may include a mobile device control module 990, a power supply 991, memory 992, a storage device 993, a network interface 994, and an external interface 999. If the network interface 994 includes a wireless local area network interface, an antenna (not shown) may be included.

The mobile device control module 990 may receive input signals from the network interface 994 and/or the external interface 999. The external interface 999 may include USB, infrared, and/or Ethernet. The input signals may include compressed audio and/or video, and may be compliant with the MP3 format. Additionally, the mobile device control module 990 may receive input from a user input 996 such as a keypad, touchpad, or individual buttons. The mobile device control module 990 may process input signals, including encoding, decoding, filtering, and/or formatting, and generate output signals.

The mobile device control module 990 may output audio signals to an audio output 997 and video signals to a display 998. The audio output 997 may include a speaker and/or an output jack. The display 998 may present a graphical user interface, which may include menus, icons, etc. The power supply 991 provides power to the components of the mobile device 989. Memory 992 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 993 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An access point comprising:
a medium access control module to
designate a predetermined time period to communicate with a first set of client stations, and
instruct a second set of client stations to transmit data at a time other than the predetermined time period; and
an acknowledgment generating module to generate a plurality of acknowledgements in response to receiving data from the first set of client stations during the predetermined time period,
wherein the medium access control module is further to
aggregate the plurality of acknowledgements in a single aggregated frame, wherein the single aggregated frame includes a plurality of sub-frames, and wherein each sub-frame of the single aggregated frame includes one of the plurality of acknowledgements, and
transmit the single aggregated frame to the first set of client stations during the predetermined time period.

2. The access point of claim 1, further comprising a power control module to control transmit power levels of one or more of the first set of client stations to ensure a predetermined quality of reception for the first set of client stations.

3. The access point of claim 1, further comprising:
an asynchronous mode control module to generate configuration data for the first set of client stations, wherein the configuration data includes at least one of a code, a portion of bandwidth, and a time within the predetermined time period to be used by the first set of client stations to transmit data,
wherein the medium access control module is further to (i) transmit the configuration data to the first set of client stations and (ii) receive data transmitted asynchronously by the first set of client stations in accordance with the configuration data.

4. The access point of claim 1, wherein the medium access control module is further to receive, during the predetermined time period, data transmitted by the first set of client stations without sensing channel.

5. The access point of claim 1, wherein the medium access control module is further to receive, at a time other than the predetermined time period, data transmitted by the second set of client stations by sensing channel.

6. A method comprising:
designating a predetermined time period for a first set of client stations to communicate with an access point;
instructing a second set of client stations to not transmit data during the predetermined time period;
generating a plurality of acknowledgements in response to receiving data from the first set of client stations during the predetermined time period;

aggregating the plurality of acknowledgements in a single aggregated frame, wherein the single aggregated frame includes a plurality of sub-frames, and wherein each sub-frame of the single aggregated frame includes one of the plurality of acknowledgements; and transmitting the single aggregated frame from the access point to the first set of client stations during the predetermined time period.

7. The method of claim 6, further comprising controlling transmit power levels of one or more of the first set of client stations to ensure a predetermined quality of reception for the first set of client stations.

8. The method of claim 6, further comprising:

generating configuration data for the first set of client stations, wherein the configuration data includes at least one of a code, a portion of bandwidth, and a time within the predetermined time period to be used by the first set of client stations to transmit data;

transmitting the configuration data from the access point to the first set of client stations; and receiving data transmitted asynchronously by the first set of client stations in accordance with the configuration data to the access point.

9. The method of claim 6, further comprising receiving, during the predetermined time period, data transmitted by the first set of client stations without sensing channel.

10. The method of claim 6, further comprising receiving, at a time other than the predetermined time period, data transmitted by the second set of client stations by sensing channel.

* * * * *